United States Patent Office 3,468,833
Patented Sept. 23, 1969

3,468,833
PROCESS FOR THE PREPARATION OF LARGE-PARTICLE-SIZE LATICES
Edmund R. Meincke, Cuyahoga Falls, Ohio, assignor to The General Tire & Rubber Company, a corporation of Ohio
No Drawing. Filed Mar. 10, 1967, Ser. No. 622,073
Int. Cl. C08d 1/09; C08f 1/13
U.S. Cl. 260—29.7                            20 Claims

ABSTRACT OF THE DISCLOSURE

Synthetic polymer latices of large average-particle-size are made more rapidly by the emulsion polymerization of ethylenically unsaturated monomers in an aqueous medium containing a stable colloidal dispersion of a water-swelled polymer having either anionic or cationic groups and a surfactant having two different types of hydrophilic groups one of which can ionically associate with the ionic groups present in the water-swelled polymer.

BACKGROUND OF INVENTION

This invention relates to a method for making large-particle-size latices of synthetic polymers. More particularly, it relates to an improved process for polymerizing free-radical - polymerizable, ethylenically unsaturated monomers to provide synthetic polymer latices having an average particle size greater than about 2,000 Angstroms, containing a minimum quantity of water-soluble ingredients and capable of being produced in a one-step production process that is accomplished more rapidly than the methods of the prior art.

Synthetic polymer latices having a large average particle size are of commercial importance in a number of applications; they are particularly utilized when it is desired to employ synthetic polymer latices, either as is or compounded with aqueous dispersions of other materials, which have a maximum total solids and/or a minimum viscosity. Illustrative of commercial applications which require either high total solids and/or minimal viscosity are products such as paints, paper coatings, paper saturants, cloth coatings, adhesives, nonwoven binders, rug and upholstery backings and rubber latex foam. The prior art has not experienced extreme difficulty in producing such large-particle-size synthetic polymer latices from monoethylenically unsaturated monomers as typified by styrene, methyl methacrylate, ethyl acrylate, acrylonitrile and copolymers of such monomers. There has, though, been considerable difficulty and much experimental effort devoted to the area of producing synthetic polymer latices of flexible or elastomeric polymers containing conjugated dienes in any appreciable quantity such as 10 weight percent or more.

Generally, in the past, large-particle-size latices and particularly those derived from conjugated dienes have been produced usually at high total solids content, by one of the following synthesis methods which inherently have certain difficulties or deficiencies.

One of the earliest and still largely practiced process involves the use of a controlled amount of either a micelle-forming surfactant or a preformed synthetic polymer aqueous dispersion, commonly referred to as a "seed latex." Both methods can give high total solids latices and operate on the principle of controlling the number of sites wherein polymerization can occur and thus limit the number of polymer particles formed. Since only a limited number of polymer particles are present and since the polymerization rate is proportional to their number, polymerization times are long. An additional deficiency of such systems is their marginal colloidal stability due to the limited surfactant present, which causes considerable prefloc and coagulation in the latex.

Another method, proposed to overcome this deficiency, was the use of a normal level of surfactant to form a small-particle-size latex, which is agglomerated either during or after the polymerization reaction to provide a large-particle-size latex. This agglomeration is accomplished by temporarily weakening the stabilizing system of the latex by such means as freezing, destruction of surfactant, or mechanical shear. If the process is not closely controlled, some of the original small-particle-size polymer particles remain in the latex or if agglomeration is carried too far, large polymer particles result which have inadequate colloidal stability and a sizeable portion of the latex coagulates. When a high-solids latex is desired, it is then necessary to concentrate this agglomerated latex in a second step by such methods as creaming, centrifuging, or water evaporation. This, of course, increases cost and further complicates the latex manufacturing process.

SUMMARY OF INVENTION

In view of these deficiencies and limitations of the prior art processes, it is an object of the present invention to provide a reliable, simple, and economical method for the manufacture of synthetic polymer latices having a large average-particle-size. A further object is to produce such large average-particle-size latices at faster rates than the prior art processes. Another object is to provide synthetic polymer latices having excellent film-forming characteristics and containing a minimum of water-soluble substances. A still further object is to provide manufactured articles, particularly foams, coatings and films derived from synthetic polymer latices having a high order of physical properties and excellent water resistance. These and other objects, uses and advantages of the invention will become apparent from the description and claims which hereinafter follow.

It has now been discovered that a synthetic polymer latex having a large average-particle-size can be simply and directly produced at rapid rates in a one-step polymerization process by free radically polymerizing an ethylenically unsaturated monomer or mixture of monomers in an essentially aqueous medium containing:

(1) A colloidal dispersion of a water-swelled polymer possessing either anionic or cationic hydrophilic groups, and (2) A bihydrophilic surfactant, as more particularly characterized hereinafter, containing two different types of hydrophilic groups, one of which can ionically associate with the ionic hydrophilic groups of the water-swelled, colloidally dispersed polymer.

DETAILED INVENTION DESCRIPTION

In the following description of the invention and in the claims, hte quantity of ingredients utilized will, unless otherwise indicated, be expressed in parts, meaning parts by weight per 100 parts by weight of ethylenically-unsaturated monomer or monomer mixture charged in the invention polymerization process to make the desired synthetic polymer latex of large average-particle-size. To distinguish the synthetic polymer latex made by the invention polymerization process from the aqueous colloidal dispersion of the water-swelled polymer employed, it will be named the "final latex."

Final latex composition

The monomers primarily utilized to make the final latex by the improved polymerization process of this invention are ethylenically unsaturated organic compounds which can be readily polymerized by free-radical, addition-type reactions and have limited water solubility under the conditions of polymerization employed. Illustrative of monomers of this description which can be used are: conjugated diethylenically unsaturated compounds of four to eight carbon atoms such as butadiene, isoprene, 2,3-dimethyl butadiene, piperylene, 2-chlorobutadiene, 2,3-dichlorobutadiene, 2-bromobutadiene, 2-fluorobutadiene 2,3-difluorobutadiene, and the like; vinyl aromatic compounds, such as styrene, vinyl toluene, divinyl benzene, alpha-chlorostyrene, alpha-methylstyrene, vinyl naphthalene, paramethoxystyrene, and the like; esters of acrylic and methacrylic acids, such as methyl acrylate, ethyl acrylate, butyl acrylate, 2-ethylhexyl acrylate, methyl methacrylate, ethyl methacrylate, butyl methacrylate, octyl methacrylate, diethyl amino ethyl methacrylate, ethylene glycol dimethacrylate and the like; dialkyl esters of ethylenically unsaturated dicarboxylic acids, such as diethyl fumarate, dibutyl maleate, dimethyl itaconate and the like; amides of acrylic and methacrylic acids such as acrylamide, methacrylamide, methylol acrylamide, and the like; vinyl nitriles, such as acrylonitrile, methacrylonitrile and the like; vinyl esters, such as vinyl acetate, vinyl octoate, vinyl stearate, and the like; vinyl ethers, such as ethyl vinyl ether, butyl vinyl ether, and the like; vinyl ketones, such as methyl vinyl ketone, methyl isopropenyl ketone, and the like; vinyl aldehydes, such as acrolein, methacrolein, and the like; and vinyl halides, such as vinyl chloride, vinyl fluoride, vinylidene chloride, vinylidene fluoride, and the like.

Additionally, there may be used other monoethylenically or unconjugated polyethylenically unsaturated organic compounds which do not readily polymerize under normal emulsion polymerization conditions, such as ethylene, propylene, isobutylene, 1,5-hexadiene, and the like when they are copolymerized with the above-enumerated, readily polymerized monomers.

Generally, where it is desired to use monomers which do not have limited water solubility, that is, are soluble to the extent of about five or more parts per 100 parts of the aqueous polymerization media under the conditions of polymerization employed, they should be utilized in combination with essentially water-insoluble comonomers so as to minimize their undesirable propensity to independently form latex polymer particles thus causing the formation of a non-homogeneous latex containing substantial quantities of small-sized particles, which is generally undesirable in the practice of and to the objects of this invention.

Especially suitable for the improved polymerization process of this invention are final latex polymers and copolymers derived from conjugated diene monomers because of their many desirable properties and the difficulty of producing large-particle-size latices thereof by direct and simple means. Butadiene, isoprene and chloroprene, particularly in amounts of about 10% or more by weight, are especially desirable because they contribute low cost, flexibility, toughness, and potential crosslinkable sites to synthetic polymer latices.

In the practice of the improved polymerization process of this invention, any of the above-enumerated, free-radical-polymerizable monomers may be employed: either singularly to produce homopolymer latices, or in combination of two, three or any desired number of monomers to produce copolymer latices. The monomers chosen to make the final latex may be the same monomers utilized to produce the water-swollen, colloidally dispersed polymer as more fully described hereinafter, only partially the same, or entirely different therefrom, bearing in mind the considerations about water-soluble monomers hereinbefore described. The process of this invention is equally as facile and flexible as conventional prior art methods for preparing either synthetic homopolymer or copolymer latices. Generally, in selecting monomers to make either homopolymer or copolymer final latices the same principles and considerations apply as in producing conventional emulsion polymerization latices.

Water-swelled polymer dispersion

The colloidal dispersion of water-swelled polymer employed in the invention is derived from a polymer which has either essentially only anionic of essentially only cationic groups and which under conditions simulating those used in the invention polymerization process as hereinafter described swells 50 to 600 percent its original volume and contains little if any soluble polymer.

Because such a collodial dispersion of water-swelled polymer can be simply and directly made at low cost from a latex of a synthetic polymer having these characteristics, they are preferred in the practice of the invention and will be the type of polymers principally described and characterized in the specification. In the as-made unswelled condition, such polymer latices will be described as "water-swellable" or simply "swellable" while after being swelled they will be described as "water-swelled" or simply "swelled."

When desired there can be used instead either natural-origin or other synthetic polymers which can be formed in the invention aqueous medium into colloidal dispersions equivalent to those obtained from the synthetic polymer latices. Examples of polymers of natural origin which may be used under certain polymerization conditions are agar-agar, borax-treated carrageenan, algin or formaldehyde-crosslinked alginates. Examples of other synthetic polymers which may be used under suitable conditions are condensation polymers, addition polymers made in bulk, solution or suspension, or polymers made by ionic polymerization.

Water-swellable latices suitable for this invention can be prepared by emulsion copolymerizing in an aqueous medium:

(1) An ethylenically unsaturated organic compound or mixture of organic compounds which can readily free-radically polymerize to form an essentially uncrosslinked polymer or copolymer together with, (2) An ethylenically unsaturated organic compound or mixture of compounds containing either only anionic or only cationic hydrophilic groups which, similarly, readily free-radically polymerizes, and, (3) A polyethylenically unsaturated organic compound which can readily free-radically polymerize to form a cross-linked polymer.

Normally, the major component of the water-swellable latex polymer is the ethylenically unsaturated organic compounds or mixture of compounds which form essentially uncrosslinked polymers or copolymers and are hence named the "major monomer(s)" in the remainder of the specification. Illustrative of monomers of this description which may be used are: vinyl aromatic compounds such as styrene, vinyl toluene, alpha-chlorostyrene, alpha-methylstyrene, and the like; esters of acrylic and methacrylic acid such as methyl acrylate, ethyl acrylate, butyl acrylate, methyl methacrylate, ethyl methacrylate, butyl methacrylate and the like; dialkyl esters of ethylenically unsaturated dicarboxylic acids such as diethyl fumarate, dibutyl maleate, dimethyl itaconate and the like, vinyl nitriles such as acrylonitrile, methacrylonitrile and the like, vinyl esters such as vinyl acetate, vinyl octoate, vinyl stearate and the like, vinyl ethers such as ethyl vinyl ether, butyl vinyl ether and the like, vinyl ketones such as methyl vinyl ketone, methyl isopropenyl ketone and the like and vinyl halides such as vinyl chloride, vinyl fluoride, vinylidene chloride, vinylidene fluoride, and the like.

Likewise considered to be within this category of monomers are conjugated diethylenically unsaturated compounds of four to eight carbon atoms such as butadiene, isoprene, 2,3-dimethyl butadiene, piperylene, 2-chlorobutadiene, 2,3-dichlorobutadiene, 2-bromobutadiene, 2-fluorobutadiene, 2,3-difluorobutadiene and the like when the emulsion polymerization is conducted under conditions which minimize their propensity to behave as difunctional monomers and form crosslinked polymers, polymerization conditions which minimize crosslinking of conjugated diene monomers are well known in the art and hence need not be extensively discussed. Briefly, some such conditions which may be used are, the use of low polymerization temperatures as for example 0 to 20° C. limiting the conversion of monomers to polymer such as around 50 to 70% conversion, and the utilization of polymerization modifiers such as the alkyl mercaptans.

Ethylenically mono- or poly-unsaturated organic compounds, which do not readily free-radically polymerize, such as ethylene, propylene, isobutylene, 1,2-hexadiene, and the like can also be used when they are copolymerized with the above-enumerated readily polymerized vinyl and conjugated diene monomers.

The quantity of this major monomer or monomer mixture employed in making the water-swellable latex depends upon the quantities of the other two types of monomers required and will vary usually from about 60 to 90 mole percent. The monomer or monomeric mixtures used will generally be chosen so that the resulting water-swellable latex polymer will be compatible with the end-use application envisioned for the final latex made by the invention process. Thus, if it is desired to make a final latex or a flexible polymer, the monomers selected will be those giving a swellable latex polymer which likewise is flexible. Alternatively, where latices of hard and rigid types of polymers are desired, the monomers chosen to make the swellable latex will also preferably be those giving hard, rigid polymers. As a general rule, the major monomer or monomer mixture is selected from the same class of monomers which are utilized to make the final latex. For example, when conjugated dienes are utilized to make a final latex of a flexible polymer, the swellable latex is similarly made with a conjugated diene monomer; when vinyl chloride or methyl methacrylate is used to make a final latex of a rigid polymer, then the swellable latex similarly would normally be made with a major proportion of vinyl chloride or methyl methacrylate.

The second type of monomer required in the water-swellable latex polymer is an ethylenically unsaturated organic compound or mixture of compounds which contains either only anionic or only cationic hydrophilic groups and is readily free-radically polymerized. Illustrative of anionic ethylenically unsaturated monomers which can be used to make a swellable anionic latex are: acrylic acid, methacrylic acid, alpha-chloroacrylic acid, crotonic acid, itaconic acid, fumaric acid, maleic acid, 1-propene-2-phosphonic acid, phenylethene-2-phosphonic acid, styrene sulphonic acid, methylallyl sulphonic acid, allyl sulphonic acid, ethylene sulphonic acid. Illustrative of cationic ethylenically unsaturated monomers, which can be employed to make a swellable cationic latex are: diethylaminoethyl methacrylate, tert-butylaminoethyl methacrylate, and similar types of aminoacrylates and methacrylates such as disclosed in U.S. Patents 2,138,031 and 2,138,763; para-dimethylaminostyrene, vinyl pyridine, vinyl quinoline, and ethylenically unsaturated quaternized amines such as the chloride salt of beta-trimethylaminoethyl methacrylate, the chloride salt of beta-trimethylaminoethyl methacrylamide, 1-methyl-2-vinyl pyridinium bromide and 1,2-dimethyl-5-vinyl pyridinum methosulfate.

The quantity of hydrophilic monomer either cationic or anionic employed in the preparation of the swellable latex will vary depending upon: the quantity of swellable latex which is to be used in the polymerization process of the invention, the swelling characteristic of the swellable latex polymer under the final polymerization conditions utilized as more fully described hereinafter, and the number ($n$) of ionic hydrophilic groups present in the monomer. Generally, it is required that there be present in the swellable latex polymer at least $0.5 \times 10^{-3}/n$ gram moles and no more than $3 \times 10^{-3}/n$ gram moles of monomer per gram of swellable latex polymer if the final polymerization is to be satisfactory. Preferred limits are between $1 \times 10^{-3}/n$ gram moles and $2.5 \times 10^{-3}/n$ gram moles of either cationic or anionic monomer per gram of water-swellable latex polymer to obtain the preferred range of swelling under the conditions of polymerization generally utilized in the invention process.

Instead of using monomers which contain either an anionic or a cationic group, there may be used monomers which, after being polymerized, can be chemically treated or modified to form either anionic or cationic hydrophilic groups and give either a water-swellable or water-swelled dispersion. Thus, for example, carboxyl groups could be obtained by polymerizing an acrylate ester or acrylonitrile monomer and then hydrolyzing the resulting polymer. Phosphoric acid groups could be obtained by reacting phosphoric acids with polymer latices containing 1,2-epoxy groups. A swelled polymer dispersion having quaternary ammonium salt groups could be made by reacting a latex containing 1,2-epoxy groups in its polymer with tertiary amines and acids as shown in U.S. Patent 2,676,166. Generally, though, such post-chemical modifications are not as satisfactory, efficient, or economical a method of placing either anionic or cationic hydrophilic groups on latex polymers as starting with an anionic or cationic monomer and directly forming the polymer with the ionic hydrophilic groups contained thereon. Consequently, this constitutes the preferred method of forming the hydrophilic anionic or cationic water-swellable latices preferably utilized in the process of this invention, and is the method primarily described and illustrated in the specification.

The third required component of the water-swellable latex polymer is a polyethylenically unsaturated organic compound or mixture of compounds which can free-radically polymerize to form a crosslinked polymer. For clarity, this compound will be called the "crosslinking monomer" in the specification. Two of the principal classes of crosslinking monomers which may be employed are:

(1) Conjugated diethylenically unsaturated organic compounds having from four to eight carbon atoms, and, (2) Organic compounds having two vinylidene groups attached to a divalent organic radical which activates the vinylidene groups to make them free radically polymerizable.

Illustrative of the conjugated diethylenically unsaturated monomers which can be used are: butadiene, isoprene, 2,3-dimethyl butadiene, 2-chlorobutadiene, 2,3-dichlorobutadiene, 2-fluorobutadiene, and the like. As can be seen, this class of difunctional crosslinking monomer is identical to some of the major monomers. Whether these conjugated diethylenically unsaturated monomers function in the preparation of the water-swellable seed latex as the crosslinking monomer, the major monomer, or simultaneously in both capacities depends upon the presence and quantity of polymerization chain transfer agent and/or the utilization of polymerization conditions which inhibit their propensity to crosslink. It is preferred to use polymerization chain transfer agents because they permit faster polymerization and/or higher conversions, thus minimizing cost. Because aliphatic mercaptans such as dodecyl mercaptan are quite efficient chain transfer agents for conjugated dienes, they are normally employed. In some cases, depending upon the conditions of the polymerization and the comonomers employed with the diene monomer no chain transfer agent may be necessary.

The second class of crosslinking monomers is illustrated by such compounds as ethylene bisacrylamide, ethylene bis-methacrylamide, ethylene diacrylate, the bis-acrylate of diethylene glycol, the bis-acrylate of dipropylene glycol, tetramethylene dimethacrylate, vinyl methacrylate, divinyl benzene, allyl methacrylate, diallyl ether, divinyl phthalate, and diallyl adipate. Because they are more economical, it is preferred to employ bis-vinylidene crosslinking monomers of lower molecular weights, such as divinyl benzene, vinyl methacrylate, ethylene bis-acrylamide, ethylene diacrylate, and the bis-acrylate of diethylene glycol. With this class of crosslinking monomers normally only small quantities are necessary to achieve the degree of crosslinking in the swellable latex polymer required for it to exhibit the desired degree of swelling in the final polymerization. Generally, depending upon their reactivities, approximately 0.01 to one mole percent of the total monomers charged is sufficient. In cases, though, where sluggish bis-vinylidene monomers such as the diallyl substituted compounds are used, it may be necessary to charge larger quantities such as from one up to five or even ten mole percent of the total charged monomers.

When only conjugated diene crosslinking monomer(s) are used, about the minimum quantity that can be employed is about ten mole percent of the total monomers charged. When both classes of crosslinking monomers are used to make the swellable latex polymer, lesser quantities of each will be required as each will be contributing to the crosslinking.

The swellable latex is made by conventional emulsion polymerization processes using free radical initiators and suitable surfactants in quantities sufficient to give a stable latex.

As is known, the choice of the surfactant depends upon whether the swellable latex is anionic or cationic. To make an anionic latex there is employed either an anionic surfactant or a non-ionic surfactant, or mixtures thereof. To make a cationic latex it is necessary to employ either a cationic surfactant or a non-ionic surfactant, or mixtures thereof. The quantity of surfactant required depends, as is known, on a number of variables, such as the nature and effectiveness of the surfactant, the type of monomers being polymerized, the conditions of polymerization and the latex particle size desired. To produce final latices containing a minimum quantity of hydrophilic ingredients and hence exhibiting maximum water resistance, only as much surfactant should be used as required to give a stable swellable latex.

Similarly, the choice of free radical initiator for the preparation of the swellable latex is conventional. Typical polymerization initiators which can be used include persulfates, perborates and percarbonates, hydrogen peroxide, organic peroxides and azonitrile compounds, such as described in the U.S. Patent 2,471,959. When low polymerization temperatures are desired, the peroxidic type catalysts can be activated with reducing agents to provide redox types of initiator systems. When maximum water insensitivity in the final latex composition is desired, initiators which are or produce products which are fugitive or hydrophobic should be used.

Since the swellable latex is subsequently diluted with water, its total solids is not critical, although for maximum economics it is desirable to have as high polymer solids as possible.

In making the swellable latex, the monomers are charged according to common-practice procedures. Thus all or some of the monomers may be charged in whole or in part at the beginning of the polymerization, and, any balance may be charged either individually or in combination incrementally or continuously during the polymerization. As is known, the method of charging monomers is often dictated by the relative reactivity ratios and/or the water solubility of the various monomers being copolymerized. Thus, where a monomer or mixture of monomers polymerizes at a much faster rate than the other monomers comprising the swellable latex polymer, or is very water-soluble, it would be necessary to charge such monomer or monomer mixture at a lesser concentration at the beginning and add the balance during the polymerization to insure a uniform composition in the water-swellable latex polymer. For example, in preparing a swellable latex polymer consisting of butadiene, styrene and methacrylic acid, a more homogeneous polymer having uniform swelling characteristics is obtained when the methacrylic acid is added in two or more increments during the polymerization. Another method which promotes homogeneous polymer compositions is to use a comonomer whose reactivity ratio with the faster or slower polymerizing monomers causes a more uniform distribution of the monomers in the final polymer. Thus, in the previously exemplified butadiene-styrene-methacrylic acid terpolymer, methacrylic acid is more uniformly distributed when a fourth monomer, such as acrylonitrile in the ratio of about 5 to 15 parts per 100 parts total monomer charged, is employed. Another example of a compatibilizing monomer is the use of methacrylic acid in preparing butadiene-styrene-fumaric acid swellable polymer latices to overcome the tendency of fumaric acid to copolymerize slowly.

Although the swellable latex employed in the process of this invention is utilized in a water-swelled condition, the viscosity and total solids of the final latex is influenced by its original, unswelled, average-particle-size. To obtain the largest average-particle-size in the final latex together with the attendant minimum viscosity or high total-solids, it is necessary to employ a water-swellable seed latex which has an average particle size of about 1,500 to 2,000 Angstroms or greater in the unswelled state. Utilizing such a latex there can be obtained final latices having: an average particle size of about 4,000 Angstroms or greater, total-solids ranging up to 60 to 65% and acceptable viscosities. When high total-solids or minimum viscosities are not required, it is possible to use swellable latices having a smaller average-particle-size and obtain final latices having about 45 to 55% total-solids and acceptable viscosities.

For maximum economy, it is desirable to drive the polymerization of the swellable latex to completion. When incomplete, e.g., 80–95%, but with the ionic hydrophilic monomer essentially all polymerized, the resulting swellable latex may be used if the residual monomers would not deleteriously affect the final latex. When they would, the residual monomers should first be removed. Generally, it is undesirable to utilize a swellable latex containing any appreciable quantities of residual ionic monomer because it can adversely affect the particle-size distribution of the final latex.

Although a swellable latex polymer which increases in volume 50 to 600 percent constitutes the minimum and maximum limits of swelling suitable for the invention process, it is normally preferred to utilize a swellable latex in which the polymer increases only about 100 to 500 percent in volume under conditions simulating the invention process. When the swellable latex polymer swells appreciably less than 100 percent the final latex, although being very prefloc[1]-free, exhibits viscosities too high for many applications. Conversely, when the swellable latex polymer swells more than 500%, the final latex, although exhibiting minimum viscosity, possesses excessive prefloc which manifested itself as a graininess making it unsuitable for certain applications.

In addition to these swellability limitations it is necessary for the production of satisfactory final latices that the swellable latex polymer contain little if any soluble polymer under the polymerization conditions employed in the invention process. Generally the fraction of soluble polymer should not exceed 2% and preferably should be 1% or less of the latex polymer. A high fraction of soluble polymer (e.g., more than 2%) is normally associated with highly swelled polymer dispersions (e.g., those which are swelled more than 500–600 percent) and like them tend to give final latices which possess excessive prefloc and which consequently cannot be readily filtered and/or further processed.

The swelling characteristic of and the fraction of soluble polymer in the swellable latex polymer under conditions simulating those used in the invention process and consequently its suitability in the invention process can

---

[1] Prefloc—Fine, large-particle-size, dispersed solids. Normally measured as the amount of unfilterable latex solids. Causes a latex to be grainy in appearance and exhibit poor filtering character through a tightly square woven cotton cloth.

be determined by immersing a thin film (about 0.001 to 0.005 inch thickness) of the swellable latex solids in an aqueous solution of the bihydrophilic surfactant and either acid or base at the concentrations, pH and temperature utilized in the final latex polymerization. When the film reaches an equilibrium condition, the volume increase and the fraction of soluble polymer is determined.

The volume increase can be determined by any number of methods as apparent to those skilled in the art. Two methods which have been satisfactorily used consist of measuring either the dimensional change or the weight increase of the latex-solids-film test specimen (such as a 1″ x 2″ rectangle) and calculating the increase in volume with the following formulae:

Percent volume increase (based on dimensional change)
$$=\frac{L_s^3-L_i^3}{L_i^3}\times 100$$

where $L_s$=swelled dimension of film specimen and $L_i$ =initial dimension of film specimen.

Percent volume increase (based on weight increase)
$$=100\times\frac{W_s-W_i}{D_a}\left(\frac{W_i}{D_f}\right)$$

where
$W_s$=weight of swelled film specimen
$W_i$=weight of film specimen initially
$D_a$=density of aqueous swelling solution [2]
$D_f$=density of film specimen initially [2]

The fraction of soluble polymer can be determined either from the corrected weight of the swelled film after drying or the corrected weight of the extract present in the swelling solution using the following formulae:

Percent soluble polymer (based on weight of swelled film after drying)
$$=\frac{W_i-(W_d+W_n)}{W_i-W_n}\times 100$$

Percent soluble polymer (based on weight of extract)
$$=\frac{W_e-(W_n+W_a)}{W_i-W_n}\times 100$$

where:
$W_i$=weight of film specimen initially
$W_d$=weight of film specimen after immersion and drying
$W_n$=weight of nonvolatile, water-soluble ingredients present in the swellable latex polymer (surfactants, electrolytes, etc.)
$W_e$=weight of extract
$W_a$=weight of non-volatile acid or base and bihydrophilic surfactant used in the swelling solution Generally immersion of the latex solids film for a period of around 16 to 24 hours is sufficient to insure an equilibrium degree of polymer swelling and solubility. To insure the determination of reliable swelling and solubility values, the latex solids film to be immersed should be substantially dry (i.e., contain less than 1% water) and continuous. When the swellable latex solids do not coalesce to give continuous films, it may be necessary to include a fugitive plasticizer to aid coalescence which should, of course, be essentially removed from the test film prior to testing.

Although only one swellable seed latex polymer is usually employed in the invention process, two or even more different swellable polymers, each of the aforedescribed character, may be used, if required, to produce final latices having special properties.

Bihydrophilic surfactant

The bihydrophilic surfactant employed in the invention process contains at least two different types of hydrophilic groups, one of which can, under the conditions of polymerization, ionically react or associate with the ionic hydrophilic groups present in the water-swelled latex polymer. Thus, depending upon whether the swellable latex polymer contains anionic groups or cationic groups, the bihydrophilic surfactant must have an ionic hydrophilic group of opposite charge. For example, a bihydrophilic surfactant used with an anionic water-swellable latex polymer must have a cationic hydrophillic group. Conversely, when the water-swellable latex polymer is cationic, the bihydrophilic surfactant must possess an anionic hydrophilic group. The second hydrophilic group either is an ionic hydrophilic group of opposite charge to that necessary to react with the ionic hydrophilic group of the swellable latex polymer (in other words, of the same ionic charge as the ionic hydrophilic group present in the swellable latex polymer) or is a nonionic hydrophilic group.

It has generally been observed that bihydrophilic surfactant which operates satisfactorily in the invention polymerization process usually has one or more of the following general characteristics:

(1) Its hydrophobic part has a total of at least 8 carbon atoms which are substituted with only hydrogen and/or halogen atoms.

(2) It has an HLB value of 2.7 or greater.

(3) In the case of bihydrophilic surfactants containing a nonionic hydrophilic group, those derived from the condensation of ethylene oxide have an average of at least 5 condensed ethylene oxide groups while those depending on OH substituents have 3 or more OH groups on the hydrophilic segment.

(4) It is dispersible at the concentration employed in an aqueous medium simulating the final polymerization environment.

It is believed necessary that the hydrophobic part of the bihydrophilic surfactant contain at least 8 carbon atoms whose valences exclusive of those bonded to the hydrophilic groups are substituted only with hydrogren and/or halogen (Fl, Cl, or Br) atoms so that it can either solvate or be solvated by the final latex monomers. The carbon atoms so bonded to hydrogen and/or halogen are linked together usually in a single segment (exception being cationic surfactants having 2 or more segments bonded to N) with no intervening heteroatoms such as O or S. The segments may be alkyl, cycloalkyl, or aryl radicals, or any combination of these radicals and may be saturated or unsaturated.

The observation that the bihydrophilic surfactant possess an HLB value of at least 2.7 is considered to be a minimum for surfactants which can be successfully utilized in the practice of this invention. HLB is an abbreviation of the expression "hydrophile-lipophile balance" and is an arbitrary value determined either by calculation or empirically. The calculation of HLB is based on the structure of the surfactant which is unassociated with the hydrophilic groups of the water-swelled latex polymer and hence available to function as a surfactant in the emulsion polymerization process. This calculation is made by summing the group numbers for each structural component of the surfactant by the method disclosed on pages 430 and 431 of the publication, "Gas/Liquid and Liquid Interfaces, Proceedings of the Second International Congress of Surface Activity," published by Butterworth's Scientific Publications, 1957. According to the originator of this concept, J. T. Davies, the HLB value equals 7 plus the sum of the hyrophilic group members minus the sum of the group numbers assigned to each carbon atom attached to hydrogen. As

---

[2] Although to be precisely accurate, these densities would have to be determined at the immersion temperature employed, a sufficiently accurate value of swelling is obtained by using the density values measured at a temperature (e.g., 20–25° C.) more convenient for measurement.

utilized in this context, the value of the groups numbers which are used to calculate the HLB numbers of surfactants suitable in the practice of this invention are:

| Hydrophilic groups— | Group number |
|---|---|
| —$SO_4$—$Na^+$ | 38.7 |
| —COO—$K^+$ | 21.1 |
| —COO—$Na^+$ | 19.1 |
| —N(tertiary amine) | 9.4 |
| —COOH | 2.1 |
| —OH | 1.9 |
| —O— | 1.3 |
| $-\overset{\overset{O}{\|}}{C}-O-$ | 2.4 |
| —$CH_2$—$CH_2$—O— | 0.33 |

Lipophilic groups—

| =CH— | 0.475 |
|---|---|
| =$CH_2$ | 0.475 |
| —$CH_3$ | 0.475 |

I have observed that the same group number value of 0.475 can be applied to lipophilic carbon groups partially or completely bonded to halogen atoms (Br, Cl or F) instead of hydrogen and hence use this value in the HLB calculations.

In making this calculation, the ionic hydrophilic group which can associate with the hydrophilic group of the swelled latex polymer is excluded in the computation as it is considered to be unavailable in determining the surface active character of the surfactant and its suitability for the invention process. Thus with ionic/nonionic bihydrophilic surfactants, only the nonionic hydrophilic group is considered in calculating the HLB value, while with amphoteric surfactants, only the ionic group having the same charge as the hydrophilic ionic group of the swelled latex polymer is used in the calculation.

A second method of determining the HLB value of candidate bihydrophilic surfactants where the chemical structure (is unknown and a calculated value hence unobtainable, is based on a modication of the method developed by N. C. Griffin and reported in J. Soc. Cosmetic Chemists 1, 311 (1949), and 5, 249 (1954). His methods are modified to the extent that the experimental conditions of temperature and pH are adjusted to duplicate those to be employed in the final polymerization.

The observation that ionic/nonionic bihydrophilic surfactants derived from the condensation of ethylene oxide contain an average of at least five moles of ethylene oxide condensed with each mole of surfactant is based on the finding that when less are present they do not operate satisfactorily in the invention process, apparently because of insufficient hydrophilic character to possess surface active properties. Similarly, an analagous situation is observed with nonionic groups derived from polyhydroxyl compounds. Only those bihydrophilic ionic/nonionic surfactants of this type which have 3 or more OH groups bonded to the hydrophilic segment are effective in the invention process. Illustrative of suitable polyhydroxy segments would be those derived from pentaerythritol and anhydrosorbitols.

The observation that suitable bihydrophilic surfactants be generally dispersible in an aqueous medium simulating that utilized in the final polymerization is based on using temperatures and pH conditions in the presence of all the recipe ingredients except for monomers and the swellable latex. Under such conditions suitable surfactants form at least poor dispersions in the concentrations used in the final polymerization recipe.

Illustrative of anionic groups present in amphoteric and anionic/nonionic surfactants employed in the practice of this invention are: carboxyl (—COOH), sulfate (—$OSO_3H$), sulfonic (—$SO_3H$),

phosphoric or

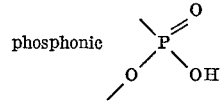
phosphonic groups.

Illustrative of cationic groups present in amphoteric and cationic/nonionic surfactants used in the invention process are amine groups either primary, secondary or tertiary) or quaternary ammonium groups which can have as substituents (other than the hydrogen atoms present in primary and secondary amines) and non-acid radical of aliphatic, cycloaliphatic, or aromatic character which is substituted or unsubstituted, saturated or unsaturated, and contains either C-to-C, or C-to-heteroatom (O, S, N,) bonds, bearing in mind the requirement that there be present a hydrophobic part(s) having at least 8 carbon atoms bonded to H, Cl, Br, or F atoms.

There should be present in either the amphoteric or ionic/nonionic surfactants only one ionic group of a charge opposite from that of the ionic group in the swellable latex polymer with which it is used in the polymerization process of the invention. For example, bihydrophilic surfactants having only one cationic group should be used with anionic latices while bihydrophilic surfactants having only one anionic group should be used with cationic latices.

In the polymerization process of the invention, the ionic hydrophilic group associated with the ionic group of the water-swelled latex polymer is believed to be present primarily in an associated ionic configuration. With amphoteric type surfactants the other ionic hydrophilic group is believed to be present in an ionized nonassociated state under the invention polymerization conditions.

In contrast to the requirement for only a single associated ionic group there may be more than one of the nonassociated hydrophilic groups either ionic, nonionic or both in bihydrophilic surfactants suitable for the invention. As a practical matter, though, such types are not common, or economically synthesized, hence bihydrophilic surfactants normally used have only two hydrophilic groups.

Typical of amphoteric surfactants which can be used in this invention process are compounds having the formulas:

(1)
$$R_1-\underset{\underset{R_2}{|}}{N}-R_3-X$$

where; X is a —COOH, —$SO_3H$, or —$OSO_3H$ group, $R_1$ is an organic group having 8 to 18 hydrogen- and/or halogen-substituted carbon atoms, $R_2$ is hydrogen or an organic group having 1–18 hydrogen- and/or halogen-substituted carbon atoms and $R_3$ is a hydrocarbon group of 1 to 8 carbon atoms.

(2)
$$R_2-\underset{\underset{R_3}{|}}{\overset{\overset{R_1}{|}}{N}}-R_4-X$$

where; X is a —COOH, —$SO_3H$, or —$OSO_3H$ group, R is an organic group of 8 to 18 carbon atoms having hydrogen- and/or halogen-substitution and $R_2$, $R_3$ and $R_4$ are organic groups each having 1 to 30 carbon atoms with the total carbon atoms in the four groups being limited to that number which still gives a surfactant having water dispersibility in the invention polymerization process.

Examples of these and other suitable amphoteric surfactants are: N-dodecylglycine, N-hexadecyl-beta-alanine, N-coco amino butyric acid, N,N-dimethyl-N-decyl glycocoll, 2-octadecyl imidazoline glycine, B-(N,N-dimethyl-N-nonyl) ammonium ethyl phosphonate, N,N-dibenzyl-N-methyl taurine, and 2-(N-dodecyl-benzyl-N,N-dimethyl ammonium)-ethyl sulfate.

Illustrative of cationic/nonionic bihydrophilic surfactants which can be used are compounds such as:

(1) The condensation products of one mole of a fattyamine having 12 to 18 carbon atoms with 5 or more moles of ethylene oxide.

(2) The condensation products of 1 mole of a rosin amine with 5 or more moles of ethylene oxide.

(3) The quaternary ammonium salts obtained by the reaction of a hydrocarbon monochloride with the polyethenoxy fatty amines or rosin amine described in 1 and 2.

Examples of these and other suitable cationic/nonionic surfactants are:

(1) The reaction product of 5 moles of ethylene oxide with 1 mole of decylamine.

(2) The reaction product of 10 moles of ethylene oxide with 1 mole of dodecylamine, or (3) The reaction product of methyl chloride with N-propyltridecylamine condensed with 15 moles of ethylene oxide per mole of the amine.

Illustrative of anionic/nonionic type bihydrophilic surfactants which can be used are compounds having the general formula:

(1) $\quad$ R—$(OCH_2CH_2)_n$—X (2)
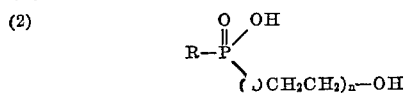

or

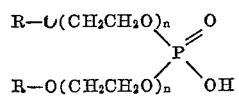

where R is an alkyl, cycloalkyl, aryl or alkaryl organic group having at least 8 carbon atoms, X is a —$SO_3H$ or —$OSO_3H$ group and $n$ is a number equal to 5 or more. Specific examples of suitable surfactants of this description are lauryl polyethenoxy ether sulfate (having an average of six condensed ethylene oxide groups per molecule), octyl phenyl polyethenoxy ether sulfonate (having an average of 10 condensed ethylene oxide groups per molecule), the polyethenoxy half ester of octadecanephosphonic acid (having an average of 6 condensed ethylene oxide groups per molecule).

Although only one bihydrophilic surfactant is normally used in the invention process, two or more bihydrophilic surfactants may, if desired, be employed so long as each is chosen according to the aforedescribed principles.

Polymerization process description

The emulsion polymerization process of this invention is generally conventional in regard to the usual process parameters, such as polymerization initiators, modifiers, short stops, temperatures, pressures, agitation, polymerization environments, methods of charging monomers and other recipe ingredients, and so forth. Consequently, the same considerations normally apply to practicing the invention process, as are commonly applied by those skilled in the art in conducting conventional emulsion polymerization processes.

Thus, in the invention process there is normally utilized conventional polymerization initiators, such as persulfates, perborates, percarbonates, hydrogen peroxide, organic peroxides, and azole and diazole compounds. When desirable to conduct the polymerization at low or moderate temperatures, there can be used the well-known redox initiating systems, which employ oxidizing and reducing compounds to form free radicals at low or moderate temperatures. To achieve maximum water resistance in the final latex polymers, there should be used polymerization initiators which give disassociation products which are fugitive or have little or no water solubility such as organic peroxides, hydrogen peroxide, or the azole type of initiators.

Similarly and especially in the polymerization of conjugated diene monomers, there may be employed polymerization modifiers to prevent excessive crosslinking and/or limit the molecular weight of the resulting latex polymer. Analogously, it may be desirable to include shortstopping agents such as sodium dimethyl dithiocarbamate at predetermined conversions to prepare final latex polymers having a particular degree of polymerization and absence of crosslinking.

Likewise, the temperature, pressure, and method of agitation are not critical and generally conform to the practices of conventional emulsion polymerizations.

The method of charging monomers is similarly conventional. Thus, any of the many ways practiced in the art can be used, such as charging all of the monomers at the beginning, intermittently or continuously during the course of the polymerization depending on such factors as the type of polymer desired in the final latex such as random, graph, or block copolymers, the reactivity ratios of the monomers, and the distribution characteristics of the monomers between the monomer-polymer and the aqueous phases. Generally, as in conventional emulsion polymerizations, it is desirable to run to as high a conversion of monomer to polymer as possible in making latices by the polymerization process of this invention. In certain instances, such as when conjugated diene monomers are used, the polymerization may be terminated sooner where limited-molecular-weight, low-branched or uncrosslinked polymers are desired. When conversion is nearly complete, unpolymerized monomers may either be removed or allowed to remain depending on their effect on the final latex and its anticipated end use. Of course, when appreciable residual monomer is present, it is necessary that it be removed. Generally, the degree of conversion and the necessity for removing residual monomers corresponds to that practice used with conventional emulsion polymerization processes.

Although the invention process is normally conducted in only an aqueous medium, when very low temperatures are used water-miscible solvents such as methanol may be present in small quantities to lower the freezing point. When latices of high total solids are desired (50–65% nonvolatile) only enough water to give stable latices of this solids content and acceptable viscosity levels is used. When high solids are not required there will generally be used enough water in the polymerization to give final latices having 35 to 50% nonvolatile content.

The invention process differs primarily from conventional emulsion polymerization processes in its utilization of the unique surfactant system consisting essentially of the aforedescribed water-swellable latex polymers and bihydrophilic surfactants.

The quantity of the swellable latex polymer required in the invention process depends principally on two factors: the concentration of the hydrophilic ionic groups in the polymer and the degree of polymer swelling under the polymerization conditions utilized. The minimum quantity of the swellable latex polymer which has been found satisfactory provides, per 100 grams of the monomer charged to make the final latex, at least $4 \times 10^{-3}$ gram moles of the hydrophilic ionic group in the polymerization system. It has generally been observed that this minimum concentration is most satisfactory when it is employed in polymerization systems in which the swellable latex polymer exhibits a high degree of swelling, such as around 500 to 600%. At the preferred level of swelling of about 100% to 500%, best results are obtained with a concentration of swellable latex polymer providing about 6 to $30 \times 10^{-3}$ gram moles of the hydrophilic ionic group. The maximum concentration which is considered practical from the standpoint of both cost and the properties it imparts to the final latex, provides about $50 \times 10^{-3}$ gram moles of hydrophilic ionic group and is generally used in polymerization systems in which the swellable latex polymer swells only about 50 to 100%.

Depending on the gram moles of hydrophilic ionic group present in the swellable latex polymer, it would be necessary to use per 100 grams of the monomers charged in the invention process the weight quantities of swellable latex polymer shown in Table I.

TABLE I

| Gram moles of hydrophilic ionic group required | Gram moles of ionic group present in each gram of swellable latex polymer | Weight (in grams) of swellable latex polymer required |
|---|---|---|
| Minimum $4 \times 10^{-3}$ | Minimum $0.5 \times 10^{-3}$ | 8. |
| | Preferred range 1 to $2.5 \times 10^{-3}$. | 4 to 1.6. |
| | Maximum $3 \times 10^{-3}$ | 1.3. |
| Preferred Range 6 to $30 \times 10^{-3}$. | Minimum $0.5 \times 10^{-3}$ | 12 to 60. |
| | Preferred range 1 to $2.5 \times 10^{-3}$. | At $1 \times 10^{-3}$ concentration 6 to 30; at $2.5 \times 10^{-3}$ concentration 2.4 to 12. |
| | Maximum $3 \times 10^{-3}$ | 2 to 10. |
| Maximum $50 \times 10^{-3}$ | Minimum $0.5 \times 10^{-3}$ | 100. |
| | Preferred range 1 to $2.5 \times 10^{-3}$. | 50 to 20. |
| | Maximum $3 \times 10^{-3}$ | 16.6. |

In addition to choosing the quantity of water-swellable latex polymer based on its swelling characteristics and concentration of ionic groups, it is generally desirable for economic and practical reasons that the quantity should not be less than about 2 parts nor more than about 30 parts and preferably should be about 4 to 20 parts of the swellable latex polymer per 100 parts of the final latex monomers charged in the invention polymerization process. As can be seen from the table, when very low or high concentrations of ionic groups are used which are provided with swellable latex polymers having very high or very low concentrations of ionic groups respectively, the quantity of swellable latex polymer required would fall outside these more practical and desirable minimum and maximum limitations. Although such small and large quantities of swellable latex polymer operate in the invention process, they are not preferred and are generally best avoided. Normally the swellable latex polymer should be synthesized with a concentration of ionic groups so that the range of ionic groups preferred to make the final latex can be provided by from about 4 to 20 parts of the swellable latex polymer. When less than 2 parts is used, the final latex begins to demonstrate signs of instability, such as prefloc, while when more than 30 parts are employed, it is difficult to obtain a large-particle-size final latex, and the economics are unfavorable.

The second major component of the surfactant system employed in the polymerization process of the invention is the bihydrophilic surfactant aforedescribed. It has been discovered that even small quantities of such bihydrophilic surfactants operate to a limited extent in the invention process. As a practical minimum, though, it is required that there be employed at least 0.2 gram of bihydrophilic surfactant per 100 grams of final monomer charged. Generally though, it is preferred to employ even larger quantities than this, such as around 0.4 to 1.5 grams per 100 grams of final monomer charged, to attain maximum polymerization speed and minimum latex coagulation. The maximum quantity of bihydrophilic surfactant is dictated by the consideration that under the conditions of polymerization chosen, it should not be present in a quantity sufficient to form appreciable quantities of micelles unassociated with the water-swelled latex polymer. This maximum can be determined by titrating the water-swelled latex with the chosen bihydrophilic surfactant or surfactants under the conditions of polymerization to be utilized and measuring after the system has equilibrated the quantity of unassociated surfactant by tests such as surface tension or electrical conductance. Since little or no unassociated bihydrophilic surfactant should be present in the aqueous phase, the surface tension should be no more than the minimum observed when the bihydrophilic surfactant is present in excess. As a practical matter it is preferred that the maximum quantity of bihydrophilic surfactant which can be used is that quantity which will not lower the surface tension of the polymerization medium below about 40 to 45 dynes/cm. under the conditions of polymerization utilized. It is not possible to define absolutely this maximum as it depends on a number of interrelated factors such as the swelling character of the swellable latex polymer, the concentration of hydrophilic groups in the swellable latex, the pH of the polymerization system, and the character of the bihydrophilic surfactant as determined by its structure, molecular weight, and the type of hydrophilic ionic group present. Generally, though, it has been observed that the maximum quantity of bihydrophilic surfactant which can be used will range from about 0.3 to 0.5 gram mole per gram mole of the hydrophilic ionic group present in the swellable latex polymer.

A third major requirement of the invention process is that the aqueous polymerization medium have a particular pH range. In polymerization employing a swellable anionic latex polymer and a bihydrophilic surfactant containing a cationic hydrophilic group, the aqueous media must have a pH of at least 8.0 and preferably have a pH ranging from about 8.5 to 10.5. Generally, it is not desirable that the pH be much above about 11.0 since above this, it is believed, the base(s) utilized displaces the bihydrophilic surfactant associated with the water-swelled latex polymer, causing the formation of free micelles where polymerization can occur thus negating the objects and advantages of the invention. Normally to obtain this alkaline pH it is preferred to use strong bases such as potassium hydroxide, sodium hydroxide and water-soluble quaternary ammonium hydroxides as for example tetramethyl ammonium hydroxide. Alternatively there can be used in whole or in part weaker bases, such as ammonium hydroxide and water-soluble amine as for example trimethylamine, diethylamine, morpholine, butyl amine and so forth, but these are not as desirable, in that more is required to obtain the required pH. In many instances, though, where the ultimate in water resistance is required in the products derived from the latices produced by the invention process it is necessary to employ weaker bases such as morpholine, ammonium hydroxide, ethyl amine and so forth because of their fugitive nature in the products.

In polymerization employing a swellable cationic latex polymer and a bihydrophilic surfactant having an anionic group, the aqueous media must have a pH of at least 6.0 and preferably having a pH ranging from about 5.5 to 3.5. About the most acidic pH that can be tolerated is about a pH of 3.0 since below this, it is thought, the bihydrophilic surfactant is insufficiently associated with the water-swelled latex polymer to produce only the complex micelle structure believed responsible for imparting the desirable invention results. The acids which can be used to obtain this acidic pH are acids such as hydrochloric acid, acetic acid, formic acid, and so forth. When maximum water resistance is desired, fugitive acids such as acetic acid, formic acid and the like should be employed.

To prevent coagulation in the final latex, it is necessary that only monofunctional acids or bases be utilized to provide the required pH. Thus, such polyfunctional bases as calcium hydroxide, barium hydroxide, ethylene diamine an so forth or plyfunctional acids such as sulfuric acid, malonic acid, and so forth should be avoided.

Generally, it is nonadvantageous to include electrolytes such as sodium chloride or tripotassium phosphate in the invention polymerization process, as there is usually no good reason and they can adversely affect the stability of the final latex. In the few instances where such electrolytes may be used, only monovalent electrolytes such as sodium chloride should be utilized and in as small quantities as possible.

Any method of charging the swellable latex, the bihydrophilic surfactant and either acid or base which allows the swellable latex polymer to swell to the desired extent and become associated with the bihydrophilic surfactant prior to the polymerization of any appreciable quantities of the monomers is satisfactory. A satisfactory method is to dissolve the bihydrophilic surfactant in water, and with agitation add first the water-swellable latex and then the acid or base, usually diluted with water to about 10 to 20% and added slowly to minimize coagulation. After a sufficient interval to allow the surfactant components to reach a state of equilibrium, the other polymerization ingredients are charged conventionally using known techniques. Alternatively as shown in the examples some or all the polymerization initiator may be added prior to or simultaneously with the bihydrophilic surfactant. Usually the temperature of the aqueous dispersion of the bihydrophilic surfactant and the water-swelled latex polymer is brought to or near that to be employed prior to the initiation of polymerization.

An alternative method of charging the invention surfactant system, found useful in making conjugated diene latices having a high order of physical properties and being especially suitable for foam rubber applications, involves, as illustrated in Example II, holding out from the initial charge some of the bihydrophilic surfactant, water-swellable latex, and either acid or base; forming an aqueous solution of these and charging this solution in one or more subsequent increments during the course of the polymerization. Though not fully understood, it is believed that this method produces a final latex having a range of particle sizes which promotes polymer-coalesence in fabricated products produced from the resulting latex.

Normally other conventional surfactants are not used in conjunction with the swelled latex polymer and the bihydrophilic surfactant in the polymerization process of this invention. In certain instances where maximum colloidal stability is required small quantities of such surfactants may be added during the polymerization if added in a manner so that their concentration does not appreciably exceed that at which micelles would form under the polymerization conditions being utilized. Usually where this is done, it is best if they are added after all the monomers have been charged and the conversion is 50% or more.

When maximum colloidal stability is required in the final latex to withstand extreme mechanical shear, impart freeze-thaw resistance, or stabilize the latex against coagulating-type pigments, poststabilizing surfactants or protective colloids may be added after the polymerization is essentially completed.

It can be appreciated that any considerable amount of conventional surfactant added either during or after the polymerization of the final latex, increase its water sensitivity and does not allow the production of latex products having the maximum water-resistance character, and hence if possible is best avoided.

EXAMPLES

In order to more fully illustrate the invention, but not to limit it, the following examples are given in which parts and percentages are by weight unless otherwise specified.

Example I

An anionic swellable latex was prepared utilizing the following recipe.

| Ingredient: | Grams |
|---|---|
| Deionized water | 1500 |
| Potassium persulfate | 5 |
| Sodium dodecyl benzene sulfonate | 10 |
| Disodium dodecyl diphenyl ether disulfonate (45% aqueous solution) | 44 |
| Preblended: | |
|     Methacrylic acid | 140 |
|     Acrylonitrile | 100 |
|     Styrene | 400 |
|     Tertiary dodecylmercaptan | 8 |
| Butadiene | 360 |

All the ingredients except butadiene were charged in the order listed into a one-gallon pressure vessel fitted with a stirrer and immersed in a controlled-temperature water bath. Air was purged from the vessel by evacuation and refilling with $N_2$. The butadiene was then pressured in with $N_2$, the stirrer turned on, and the water bath raised to 60° C. Polymerization was continued at 60° C. for 12 hours at which time the resulting latex was discharged. The swellable latex produced had the following properties:

| | |
|---|---|
| Nonvolatile content | percent 40 |
| pH at 25° C. | 3.52 |
| Viscosity at 25° C. | centipoises 15.5 |
| Surface tension at 25° C. | dynes/cm 53.4 |
| Particle size range | Angstroms 500–800 |

This swellable latex was then used for the synthesis of a final copolymer latex using the following recipe.

| Ingredients: | Grams |
|---|---|
| Deionized water | 1130 |
| Potassium persulfate | 4 |
| Beta-N-dodecylamino sodium butyrate (40% solution in water) | 14 |
| Potassium hydroxide (85% purity) | 4 |
| Swellable latex | 150 |
| Styrene | 650 |
| Tertiary dodecyl mercaptan (dissolved in styrene) | 3 |
| Butadiene | 350 |

All the ingredients except butadiene were charged in the order listed into the same one-gallon pressure vessel hereinbefore described, all air removed and the reactor filled with $N_2$. The butadiene was then charged, the agitator turned on, and the temperature of the bath raised to 80° C. After eight hours, at about 90 percent conversion, 0.5 gram of additional potassium persulfate dissolved in 15.0 grams of deionized water was injected into the vessel. Polymerization of the latex was then continued for an additional four hours at which time the reaction was essentially complete as evidenced by a nonvolatile content of 48.5%. The properties of the resulting final latex were:

| | |
|---|---|
| Nonvolatile content | 48.5%. |
| pH at 25° C. | 9.4. |
| Viscosity at 25° C. | 86 centipoises. |
| Surface tension at 25° C. | 46 dynes/cm. |
| Appearance of film cast from latex | Clear, flexible, glossy. |
| Latex particle size range | 3500–7000 Angstroms. |
| Coagulum loss [1] | Less than 1%. |

[1] See the following equation:

$$\text{Coagulum loss} = \frac{\text{dry weight of coagulum}}{\text{weight of theoretical solids yield}} \times 100$$

When the polymerization was conducted in the absence of the amphoteric surfactant, 42 hours was required to achieve 90% conversion, and the coagulum loss was 22%.

The final latex (208 parts) was formulated into a high quality paint, by mixing it with, first, two parts of Tergitol NPX (nonyl phenol-ethylene oxide condensate) dissolved in four parts of water, and second, a pigment dispersion predispersed by means of a pebble mill consisting of:

| Material— | Parts by wt. |
|---|---|
| Titanox RA–50 (rutile titanium dioxide) | 175.0 |
| Duramite (precipitated calcium carbonate) | 82.0 |
| ASP–400 clay (kaolin clay) | 78.1 |
| Sodium pentachlorophenolate (fungicide) | 1.5 |
| Tetrapotassium pyrophosphate | 4.7 |
| Tributyl phosphate (antifoam agent) | 4.7 |
| Methocel 65–HG, 4000 cps. (cellulose methyl hydroxypropyl ether) | 4.7 |
| Deionized water | 339.0 |

The resulting paint had the following properties:

Viscosity _____ 81 Krebs units.
Brushing _____ Satisfactory.
Leveling _____ Satisfactory.
Cleanability and scrub test ____ Passed Federal Specification TTPOO–29A.

This example illustrates that a good paint can be produced from a latex made by polymerizing butadiene and styrene employing the improved process of this invention.

Example II

An anionic swellable latex was prepared utilizing the following ingredient preblends and procedure:

| Ingredient preblend | Ingredient | Grams |
| --- | --- | --- |
| A | Deionized water | 1,400.0 |
|   | Potassium persulfate | 1.0 |
|   | Sodium dodecyl diphenyl ether sulfate (45% aqueous solution) | 44.0 |
| B | Styrene | 400.0 |
|   | Acrylonitrile | 50.0 |
|   | Methacrylic acid | 140.0 |
|   | Tertiary dodecyl mercaptan | 12.0 |
| C | Butadiene | 410.0 |
| D | Deionized water | 50.0 |
|   | Ammonium hydroxide (28%) | 13.0 |
| E | Deionized water | 5.0 |
|   | Potassium persulfate | 0.5 |
|   | Sodium dodecyl benzene sulfonate | 5.0 |

Ingredient preblends A and B were charged into a one-gallon pressure vessel which was equipped with an agitator and immersed in a temperature-controlled water bath. Air in the reactor was purged by evacuating and repressurizing with nitrogen. Butadiene (C) was charged, the agitator turned on, and the bath temperature raised to 60° C. Two hours later ingredient preblend D was injected into the reactor and at six hours ingredient preblend E was added. After 16 hours the reactor was cooled and the contents removed. There was obtained a latex having the following properties:

Nonvolatile content _____ percent__ 40.5
pH at 25° C. _____ 4.8
Surface tension _____ 56.5
Particle size _____ Angstroms__ 2,000–3,000

A final latex was prepared with this anionic latex utilizing the following ingredient preblends and procedure:

| Ingredient preblend | Ingredient | Gram. |
| --- | --- | --- |
| A | Deionized water | 416 |
|   | Beta dodecyl amino sodium butyrate (40% solution in water) | 18.0 |
|   | Potassium hydroxide (85% purity) | 4.7 |
|   | Anionic swellable latex | 160.0 |
| B | Styrene | 180.0 |
|   | Azobisisobutyronitrile | 2.4 |
|   | Tertiary dodecyl mercaptan | 3.0 |
| C | Butadiene | 420.0 |
| D | Deionized water | 143.0 |
|   | Beta-N-dodecyl amino sodium butyrate (45% aqueous solution) | 12.0 |
|   | Potassium hydroxide | 3.1 |
|   | Potassium oleate (20% aqueous solution) | 60.0 |
| E | Anionic swellable latex | 110.0 |
|   | Styrene | 180.0 |
|   | Azobisisobutyronitrile | 2.4 |
|   | Tertiary dodecyl mercaptan | 0.6 |
| F | Butadiene | 420.0 |

Ingredient preblends A and B were charged to the same one-gallon pressure vessel. After replacing air in the reactor with $N_2$ as before, butadiene (C) was charged and the temperature raised to 80° C. After about four hours the pressure in the reactor had decreased to 70 pounds per square inch and the nonvolatile content of the reaction mixture had increased to 51.0%. After cooling the reaction mixture to 30° C., the agitator was turned off and ingredient preblends D, E, and F were injected into the vessel from charging bombs using nitrogen pressure. The agitator was restarted and the temperature of the reaction mixture returned to 80° C. After 19 hours the reactor pressure had dropped to five pounds per square inch and the reaction was terminated. There was obtained a final latex having the following properties:

Nonvolatile content _____ percent__ 62.1
pH at 25° C. _____ 10.2
Viscosity at 25° C. _____ centipoises__ 1280
Particle size _____ Angstroms__ 2,000–10,000

This latex was used to produce a rubber foam of the following composition.

| Material: | Grams |
| --- | --- |
| Final latex | 159.0 |
| Potassium oleate (20% solution in water) | 2.0 |
| Zinc diethyldithiocarbamate (50% dispersion in water) | 2.0 |
| Sulfur (50% dispersion in water) | 4.0 |
| Zinc salt mercaptobenzothiazole (50% dispersion in water) | 2.0 |
| Styrenated phenol (65% emulsion in water) | 1.5 |
| Triethyl trimethylene triamine (50% solution in water) | 2.0 |
| Sodium silicofluoride (50% dispersion in water) | 5.0 |

The above materials were thoroughly mixed with a conventional household type mixer. The mix after being frothed and gelled was cured in steam, and dried in a circulating hot air oven to give a foam which had a density of about 11 pounds per cubic foot and very uniform cell structure, was resilient and of light color, and had properties comparable to commercial natural rubber latex foams. This illustrates the utility of latices manufactured by the process of this invention to give high quality foam rubber products.

When Example II was repeated except for omitting the amphoteric surfactant, there was obtained even after 64 hours a latex which only had a nonvolatile content of 52% and considerable coagulum.

Example III

This example illustrates the production of a polybutadiene final latex using an anionic swellable latex and a cationic/nonionic bihydrophilic surfactant.

| Ingredient: | Grams |
| --- | --- |
| Deionized water | 300.0 |
| Cationic/nonionic surfactant [1] | 2.5 |
| Potassium persulfate | 0.6 |
| Potassium hydroxide (10% aqueous solution) | 15.0 |
| Anionic swellable latex of Example I (40% nonvolatile) | 75.0 |
| Butadiene | 200.0 |

[1] The bihydrophilic surfactant is the reaction product of one mole of dodecylamine and 35 moles of ethylene oxide.

All the ingredients except butadiene were charged into a one-quart glass bottle. After replacing residual air with $N_2$, an excess of butadiene was charged. After the excess butadiene had boiled off, the bottle was capped, placed in a water bath maintained at 50° C. and rotated end-over-end for 18 hours. There was obtained a final latex having a nonvolatile content of 39.8% (equaling a conversion of monomer to polymer of 96.4%) which was free of coagulum. The latex had the following properties:

Nonvolatile content _____ percent__ 39.8
pH at 25° C. _____ 9.4
Viscosity at 25° C. _____ centipoises__ 11.2
Surface tension at 25° C. _____ dynes/cm__ 52.4
Particle size range (diameter) __ Angstroms__ 2,000–5,000

The polybutadiene latex produced according to this example can be used for the production of high-impact plastics by polymerizing styrene and acrylonitrile in admixture with it.

A second polybutadiene latex prepared using the same ingredients and the same procedure except for omission of the bihydrophilic surfactant only reached a conversion of 63%, after 72 hours again demonstrating its critical role in the process of this invention.

Example IV

A cationic swellable latex was prepared with the following ingredients.

| Ingredients: | Grams |
|---|---|
| Water | 140.0 |
| Condensation product of one mole of nonyl phenol with 30 moles of ethylene oxide | 1.5 |
| Octadecyl dimethyl benzyl ammonium chloride | 1.5 |
| Preblended: | |
| Tertiary dodecyl mercaptan | 1.2 |
| Styrene | 45.0 |
| Acrylonitrile | 10.0 |
| Dimethylaminoethyl acrylate | 10.0 |
| Diisopropylbenzene hydroperoxide | 0.3 |
| Butadiene | 35.0 |

All the above ingredients except butadiene were charged in the order listed into a one-quart glass bottle. The residual air in the bottle was replaced with $N_2$, and an excess of butadiene added. After the excess butadiene had boiled off the bottle was capped and tumbled end-over-end for 23 hours in a water bath maintained at 60° C. at which time the pressure had dropped to almost atmospheric and the conversion of monomer to polymer was 94.5%, as evidenced by a nonvolatile content of 41.2%.

This cationic swellable latex was then used in the preparation of two different latices, labeled A and B.

| | Grams | |
|---|---|---|
| Ingredients | A | B |
| Deionized water | 130.0 | 130.0 |
| Beta-N-dodecylamino sodium butyrate (40% aqueous solution) | 0 | 2.5 |
| Cationic swellable latex | 37.5 | 37.5 |
| 10% aqueous solution of hydrochloric acid | 6.0 | 5.8 |
| Preblended: | | |
| Styrene | 66.0 | 66.0 |
| Tertiary dodecyl mercaptan | 0.2 | 0.2 |
| Diisopropylbenzene hydroperoxide | 0.4 | 0.4 |
| Butadiene | 34.0 | 34.0 |

All the ingredients except butadiene were charged in the order listed into one-quart bottles and residual air in the bottles replaced with $N_2$. Butadiene in excess was charged and after the excess had boiled off the bottles were capped and rotated end-over-end for 24 hours in a 60° C. constant temperature bath. At the end of this time latex A still had a pressure of 35 pounds per square inch, indicating incomplete reaction, and the latex had coagulated. Latex B on the other hand was free of coagulum and had a nonvolatile content of 46.5% indicating nearly 100% conversion. Latex B had a particle size range of 3,500 to 6,000 angstroms, a pH of 3.5 and a surface tension of 50.5 dynes per centimeter.

This example illustrates the successful use of cationic swellable latices in the process of this invention.

Example V

The swellable latex of Example I was exhaustively stripped with steam until residual styrene was no longer detectable. This stripped latex was then used in the preparation of vinyl chloride latices using the following formulae:

| | Grams | | |
|---|---|---|---|
| Ingredients | A | B | C |
| Deionized water | 100.0 | 100.0 | 100.0 |
| Beta-N-dodecylamino sodium butyrate (40% aqueous solution) | 0 | 1.0 | 0 |
| Cationic nonionic surfactant [1] | 0 | 0 | 0.5 |
| Potassium hydroxide (10% aqueous solution) | 5.6 | 5.6 | 5.6 |
| Swellable latex of Example I (40% nonvolatile) | 25.0 | 25.0 | 25.0 |
| Lauroyl peroxide | 0.2 | 0.2 | 0.2 |
| Vinyl chloride | 50.0 | 50.0 | 50.0 |

[1] Reaction product of 1 mole octadecylamine and 60 moles of ethylene oxide.

All the ingredients except vinyl chloride were charged in the order listed into one-quart glass bottles, the residual air in the bottles replaced with $N_2$ and an excess of vinyl chloride added. After the excess vinyl chloride had boiled off the bottles were capped and tumbled end-over-end for 21½ hours in a water bath maintained at 50° C. The polymerization data and the properties obtained on the resulting latices were as follows:

| | | | |
|---|---|---|---|
| Pressure after 21½ hours, p.s.i. | 102 | 45 | 0 |
| Conversion, percent | 61 | 92 | 96.0 |
| Nonvolatile, percent | 21.2 | 32.0 | 34.0 |
| pH at 25° C | 8.7 | 8.7 | 8.7 |
| Particle size, Angstroms | 3,500–4,000 | 3,500–4,500 | 3,500–4,500 |

This example demonstrates that the composition of the swellable latex polymer can be quite dissimilar from that of the final latex polymer and still perform satisfactorily in combination with both amphoteric and ionic/nonionic bihydrophilic surfactants in the invention process.

THEORY AND USES OF INVENTION

In the emulsion polymerization process of this invention, it is theorized that the swellable latex, when swelled in the appropriate acidic or basic aqueous media, forms with the bihydrophilic surfactant by ionic association a number of micelle-like structures within the interior of and upon the surfaces of the swollen latex polymer particles. These micelle-like structures, which have been defined as "complex micelles," are believed to provide the sites or centers wherein polymerization occurs. They differ from simple micelles formed by conventional polymerization surfactants in that they are maintained by ionic association of the bihydrophilic surfactant with the oppositely charged ionic groups of the water-swelled latex polymer. Thus, whereas the conventional surfactants give latices having a multitude of polymer particles free to move around, the complex micelle surfactant system of this invention produces polymer particles bound in and on each swollen latex polymer particle. Since the rate of emulsion polymerization is proportional to the number of micelle sites rather than the number of latex polymer particles, the invention polymerization proceeds rapidly to produce a final latex of large average-particle-size in contra-distinction to conventional seed latex polymerization processes which are many times slower.

In addition, the process of this invention produces latices which are different from those of prior art processes. Particularly the latex particles rather than being spherical are irregularly shaped clusters of polymer particles. A further distinction is that the latices can be made practically free of water-soluble ingredients (as little as 0.3% or less) and yet possess good colloidal stability. This feature is highly advantageous because coalescence and adhesiveness of the latex is promoted and latex-derived products can be made having a high level of physical properties and excellent water resistance. Hence the latices of this invention are highly useful for paper coatings, paper saturants, concrete coatings, paints, latex foams and adhesives. The irregular shape of the latex particles may also, it is believed, be contributing to the excellent coalescing and adhesive properties of the latex and the high level of physical properties observed in products made with it.

The above description is by way of illustration rather than limitation, and it will be understood that, in accordance with the provisions of the patent laws, variations and modifications of the specific compositions, products and processes disclosed herein may be made without departing from the spirit of the invention. In the claims, following, it is further to be understood that though the invention is defined in the singular, the plural is also intended when its use is described in the specification.

What is claimed is:

1. In the process of emulsion polymerizing an ethylenically unsaturated monomer or mixture of monomers to make a synthetic polymer latex, the improvement which comprises conducting the polymerization in an essentially aqueous medium containing:
   (a) 2 to 30 parts per 100 parts of the monomer or mixture of monomers of a colloidal dispersion of a water-swellable polymer or mixture of water-swellable polymers which has essentially only anionic groups or only cationic groups and which under conditions simulating those used in the emulsion polymerization process swells 50 to 600 percent its original volume;
   (b) a bihydrophilic surfactant or mixture of bihydrophilic surfactants which has an ionic group of opposite charge to that present in the polymer in a quantity of at least 0.2 part per 100 parts of the monomer or mixture of monomers but not more than that quantity which can associate with the colloidal dispersion of the water-swellable polymer or mixture of polymers; and
   (c) either a monofunctional base or mixture of bases in a quantity sufficient to give a pH of 8 to 11 when the polymer or mixture of polymers has anionic groups or, a monofunctional acid or mixture of acids in a quantity sufficient to give a pH of 6 to 3 when the polymer or mixture of polymers has cationic groups.

2. The synthetic polymer latex made by the process of claim 1.

3. The composition of matter comprising the synthetic polymer latex of claim 2 and an aqueous dispersion of a finely divided material.

4. The process of claim 1 wherein the colloidally dispersed polymer or mixture of polymers contains not more than 2 percent polymer which is soluble under conditions simulating those used in the emulsion polymerization process.

5. The process of claim 1 wherein the colloidally dispersed polymer or mixture of polymers contains per gram, $0.5 \times 10^{-3}$ to $3 \times 10^{-3}$ gram moles of either anionic groups or cationic groups.

6. The process of claim 1 wherein the colloidal dispersion of polymer is derived from a latex of a synthetic polymer and the colloidal dispersion of a mixture of polymers is derived from a mixture of latices of synthetic polymers.

7. The process of claim 6 wherein there is used per 100 grams of monomer or mixture of monomers, 4 to 20 grams of a synthetic latex polymer or a mixture of synthetic latex polymers providing $6 \times 10^{-3}$ to $30 \times 10^{-3}$ gram moles of either anionic groups or cationic groups.

8. The process of claim 6 wherein the synthetic polymer latex or mixture of latices has an average particle size greater than 1500 Angstroms.

9. The process of claim 6 wherein the pH is 8.5 to 10.5 when a synthetic latex polymer or a mixture of synthetic latex polymers containing anionic groups is used and 5.5 to 3.5 when a synthetic latex polymer or a mixture or synthetic latex polymers containing cationic groups is used.

10. The process of claim 6 wherein the synthetic latex polymer or mixture of synthetic latex polymers swells 100 to 500 percent its original volume.

11. The process of claim 10 wherein at least 10 percent by weight of the ethylenically unsaturated monomer polymerized is a conjugated diene of 4 to 8 carbon atoms.

12. The process of claim 11 wherein the conjugated diene is butadiene, isoprene or chloroprene.

13. The synthetic polymer latex made by the process of claim 12.

14. The composition of matter comprising the synthetic polymer latex of claim 13 and an aqueous dispersion of a finely divided material.

15. The process of claim 6 wherein the synthetic latex polymer or mixture of synthetic latex polymers has —$CO_2H$, —$PO_3H_2$ or —$SO_3H$ anionic groups and the bihydrophilic surfactant or mixture of bihydrophilic surfactants has in each surfactant molecule a single cationic group and at least one second hydrophilic group which is either anionic or nonionic.

16. The process of claim 6 wherein the synthetic latex polymer or mixture of synthetic latex polymers has amino or quaternized amino cationic groups and the bihydrophilic surfactant or mixture of bihydrophilic surfactants has in each surfactant molecule a single anionic group and at least one second hydrophilic group which is either cationic or nonionic.

17. The process of claim 6 wherein the bihydrophilic surfactant or mixture of surfactants has in each surfactant molecule a hydrophobic part of at least 8 carbon atoms whose valences exclusive of those bonded to the hydrophilic parts are substituted only with hydrogen, fluorine, chlorine, and bromine atoms.

18. The process of claim 17 wherein the bihydrophilic surfactant has a nonionic hydrophilic group derived from the condensation of an average of at least five moles of ethylene oxide per mole of the surfactant.

19. The process of claim 18 wherein the bihydrophilic surfactant has a calculated HLB value of at least 2.7.

20. The process of claim 6 wherein the maximum quantity of bihydrophilic surfactant or mixture of bihydrophilic surfactants used is 0.3 to 0.5 gram mole per gram mole of the anionic or cationic group present in the latex of the water-swellable synthetic polymer.

References Cited

UNITED STATES PATENTS 2,912,350  11/1959  Videen et al.
3,078,246   2/1963  Musch.

FOREIGN PATENTS 874,576  8/1961  Great Britain.

MURRAY TILLMAN, Primary Examiner

W. J. BRIGGS, SR., Assistant Examiner

U.S. Cl. X.R.

260—29.6, 80.7, 879, 880, 881